US010622857B2

(12) United States Patent
Brasas et al.

(10) Patent No.: US 10,622,857 B2
(45) Date of Patent: Apr. 14, 2020

(54) ELECTRICAL MACHINE COMPRISING RADIAL COOLING SLOTS AND WIND TURBINE

(71) Applicant: Siemens Aktiengesellschaft, München (DE)

(72) Inventors: Frank Brasas, Postau (DE); Robert Gruber, Ruhstorf (DE); Martin Krompass, Passua (DE); Oliver Memminger, Neuburg a. Inn (DE); Klaus Schifferer, Neuburg a. Inn (DE); Tobias Sperl, Pfarrkirchen (DE); Roland Zeichfüssl, Ruhstorf a.d. Rott (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 85 days.

(21) Appl. No.: 15/761,369

(22) PCT Filed: Sep. 7, 2016

(86) PCT No.: PCT/EP2016/071066
§ 371 (c)(1),
(2) Date: Mar. 19, 2018

(87) PCT Pub. No.: WO2017/050575
PCT Pub. Date: Mar. 30, 2017

(65) Prior Publication Data
US 2018/0269739 A1 Sep. 20, 2018

(30) Foreign Application Priority Data
Sep. 21, 2015 (EP) .................... 15185997

(51) Int. Cl.
H02K 1/32 (2006.01)
H02K 1/20 (2006.01)
(Continued)

(52) U.S. Cl.
CPC ................. *H02K 1/32* (2013.01); *F03D 9/25* (2016.05); *F03D 80/60* (2016.05); *H02K 1/20* (2013.01);
(Continued)

(58) Field of Classification Search
CPC .. H02K 1/32; H02K 9/02; H02K 1/20; H02K 2201/03; H02K 2201/15; H02K 3/24;
(Continued)

(56) References Cited

U.S. PATENT DOCUMENTS 2,015,554 A * 9/1935 Fisher ............... H02K 3/493
310/214
2,134,795 A * 11/1938 Myers ............... H02K 3/493
310/214
(Continued)

FOREIGN PATENT DOCUMENTS

| CN | 102025222 A | 4/2011 |
| CN | 102265487 A | 11/2011 |

(Continued)

OTHER PUBLICATIONS

PCT International Search Report and Written Opinion of International Searching Authority dated Feb. 20, 2017 corresponding to PCT International Application No. PCT/EP2016/071066 filed Jul. 9, 2016.

(Continued)

*Primary Examiner* — Jermele M Hollington
*Assistant Examiner* — Ahmed Elnakib
(74) *Attorney, Agent, or Firm* — Henry M. Feiereisen LLC

(57) ABSTRACT

An electrical machine includes a first active part and a second active part. Both the first active part and the second active part have a plurality of laminated sub-cores, with each laminated sub-core having a plurality of individual laminations. Each lamination is defined by an axial width. The laminated sub-cores are mutually spaced in an axial direction such that a respective radial cooling slot is formed between two adjacent laminated sub-cores. The radial cooling slots in the first active part are offset in the axial direction in relation to one another in comparison to the radial cooling slots in the second active part, and the sum of the axial widths of all individual laminations in the first active part corresponds to the sum of the axial widths of all individual laminations in the second active part.

14 Claims, 3 Drawing Sheets

(51) Int. Cl.
    *F03D 9/25*     (2016.01)
    *F03D 80/60*     (2016.01)
    *H02K 9/02*     (2006.01)

(52) U.S. Cl.
    CPC ........... *H02K 9/02* (2013.01); *H02K 2201/03* (2013.01); *H02K 2201/15* (2013.01); *Y02E 10/725* (2013.01)

(58) Field of Classification Search
    CPC .. H02K 5/20; H02K 9/16; H02K 9/25; H02K 7/18; H02K 7/183; F03D 9/25; F03D 80/60; Y02E 10/725
    USPC ....... 310/52, 57, 58, 59, 60 R, 61, 62, 60 A, 310/65, 214
    See application file for complete search history.

(56) References Cited

U.S. PATENT DOCUMENTS

| | | | | |
|---|---|---|---|---|
| 3,202,851 A | * | 8/1965 | Dehlendorf | H02K 1/16 310/216.048 |
| 3,784,851 A | * | 1/1974 | Fujii | H02K 1/20 310/58 |
| 4,286,183 A | * | 8/1981 | Montgomery | H02K 9/04 310/62 |
| 8,421,285 B2 | * | 4/2013 | Kori | H02K 9/12 310/58 |
| 2006/0267442 A1 | * | 11/2006 | Ionel | H02K 1/2726 310/216.004 |
| 2008/0252169 A1 | * | 10/2008 | Fujita | H02K 3/14 310/213 |
| 2009/0058205 A1 | * | 3/2009 | Tounosu | H02K 1/32 310/61 |
| 2011/0254395 A1 | | 10/2011 | Friedl et al. | |
| 2011/0278969 A1 | | 11/2011 | Memminger | |
| 2012/0187793 A1 | | 7/2012 | Hartmann et al. | |
| 2013/0076168 A1 | * | 3/2013 | Memminger | H02K 5/20 310/54 |
| 2015/0115752 A1 | * | 4/2015 | Lee | H02K 1/32 310/59 |
| 2015/0318741 A1 | | 11/2015 | Hartmann et al. | |
| 2015/0318749 A1 | | 11/2015 | Noack et al. | |

FOREIGN PATENT DOCUMENTS

| | | |
|---|---|---|
| CN | 102290922 A | 12/2011 |
| CN | 103138488 A | 6/2013 |
| CN | 203 278 421 U | 11/2013 |
| CN | 104779741 A | 7/2015 |
| DE | 10 2014 115 666 A1 | 4/2015 |
| EP | 1 050 949 A1 | 11/2000 |
| EP | 2 744 075 A1 | 6/2014 |

OTHER PUBLICATIONS

Brasas et al., U.S. Pat. No. 9,450,458, Sep. 20, 2016, 2015-0380991, Dec. 31, 2016.
Memminger et al., U.S. Pat. No. 9,225,224, Dec. 29, 2015, 2013-0076168, Mar. 28, 2013.
Memminger et al., U.S. Pat. No. 8,648,505, Feb. 11, 2014, 2011-0278969, Nov. 17, 2011.
Elender et al., U.S. Pat. No. 8,686,607, Apr. 1, 2014, 2011-0254391, Oct. 20, 2011.
Boeing et al., U.S. Pat. No. 9,051,922, Jun. 9, 2015, 2014-0302957, Oct. 9, 2014.

* cited by examiner

ELECTRICAL MACHINE COMPRISING RADIAL COOLING SLOTS AND WIND TURBINE

CROSS-REFERENCES TO RELATED APPLICATIONS

This application is the U.S. National Stage of International Application No. PCT/EP2016/071066, filed Sep. 7, 2016, which designated the United States and has been published as International Publication No. WO 2017/050575 and which claims the priority of European Patent Application, Serial No. 15185997.2, filed Sep. 21, 2015, pursuant to 35 U.S.C. 119(a)-(d).

BACKGROUND OF THE INVENTION

The present invention relates to an electrical machine comprising a first active part and a second active part, wherein both the first active part and the second active part have a plurality of laminated sub-cores, each of the laminated sub-cores has a plurality of individual laminations, each comprising an axial width, the laminated sub-cores are mutually spaced in an axial direction such that a radial cooling slot is formed between two adjacent laminated sub-cores and the radial cooling slots in the first active part are offset in the axial direction in relation to one another in comparison to the radial cooling slots in the second active part. Furthermore, the present invention relates to a wind turbine with such an electrical machine.

In the present case, interest is focused on electrical machines. Such electrical machines comprise a first and a second active part and/or a stator and a rotor. The active parts can in turn be formed from laminated cores, each having a plurality of individual laminations. The individual laminations are arranged such that radial cooling slots, through which a cooling medium can flow, are produced to guarantee adequate cooling of the electrical machine.

In particular, if the electrical machine is used as a generator in a wind turbine, the operating noises of the electrical machine are of major importance. The noise intensity area surrounding a wind turbine is usually evaluated using a sound pressure level employing the unit dB(A). Thus, there are clear limit values for the sound pressure level depending on the environment and the time of day. For example, in the area surrounding predominantly commercial facilities a limit value of 65 dB(A) must be observed during the day and a limit value of 50 dB(A) at night. In residential areas, in particular in purely residential areas, these limit values are reduced correspondingly. The noise emission of a wind turbine has various causes. Aerodynamic noises, which primarily emanate from the rotor, and a wide range of mechanical noises determine the measured total acoustic power. The various sound sources must be detected and carefully analyzed during development. Each individual cause requires special measures to realize a generally low-noise construction. As a component of the wind turbine, the wind power generator must also comply with the limit values for the sound pressure level specified by the customer. For this reason, not only compliance with the overall level but also with maximum values for individual frequencies or frequency ranges is necessary. If maximum values for individual frequencies or frequency ranges are exceeded, there is talk of individual tones and/or tonalities of the generator.

Hitherto, attempts were made to remedy problems with excessive noise emission by means of measures in the airflow of the cooling circuit and/or the cooling circuits of the electrical machine. Furthermore, the use of corresponding sound absorbing elements of different materials to reduce the noise emissions is known. In the case of synchronous machines, it is also known that the radial cooling slots in the rotor opposite the radial cooling slots in the stator are offset in relation to one another. This has the advantage that a pulsating cooling airflow from the rotor does not directly encounter obstacles in the stator cooling slots and noise emissions are thus reduced.

For this purpose, DE 10 2014 115 666 A1 describes an open induction motor in which a rotor has a structure by means of which air can flow and consequently the cooling efficiency of the rotor and a stator can be improved. The induction motor contains a stator which, having an iron stator core, contains a radial drain hole and a stator coil which is wrapped around the iron stator core. In addition, the induction motor comprises a rotor with a multiplicity of iron rotor cores which are layered in an axial direction of a rotating shaft and are connected to the rotating shaft, and with a rotor coil which is connected to the multiplicity of iron rotor cores. The rotor further comprises channel plates which are layered between the multiplicity of iron rotor cores.

Furthermore, CN 203 278 421 U describes an electrical machine with a stator and a rotor, each having radial cooling channels. The radial cooling slots of the stator and the radial cooling slots of the rotor are offset in relation to one another. Furthermore, it can be provided that the width of the cooling slot in the stator corresponds to half the width of the cooling slot in the rotor. In addition, twice as many cooling slots can be provided in the stator as in the rotor.

SUMMARY OF THE INVENTION

The object of the present invention is to demonstrate a solution to enable noise emissions to be efficiently reduced during the operation of an electrical machine.

This object is achieved according to the invention by an electrical machine and a wind turbine with the features according to the respective independent claims. Advantageous developments of the present invention are the object of the dependent claims.

An electrical machine according to the invention comprises a first active part and a second active part, both the first active part and the second active part having a plurality of laminated sub-cores. Each of the laminated sub-cores has a plurality of individual laminations, each comprising an axial width. The laminated sub-cores are mutually spaced in an axial direction such that a respective cooling slot is formed between two adjacent laminated sub-cores. In addition, the radial cooling slots in the first active part are offset in the axial direction in relation to one another in comparison to the radial cooling slots in the second active part. Furthermore, the sum of the axial widths of all the individual laminations in the first active part corresponds to the sum of the axial widths of all the individual laminations in the second active part.

The electrical machine can preferably be operated as a generator and deployed in a wind turbine. The electrical machine comprises the first active part which, for example, can be designed as a stator. In addition, the electrical machine comprises the second active part which, for example, can be designed as a rotor and can be rotatable in design in relation to the first active part. Both the first as well as the second active part comprise a laminated core having a plurality of individual laminations. The respective individual laminations can, for example, be made of iron. The individual laminations each have an axial width. The axial width describes the spatial extension of the individual lamination in an axial direction. The individual laminations in the first and second active part are in each case grouped in laminated sub-cores. Furthermore, the laminated sub-cores in an axial direction are mutually spaced. A radial cooling slot is formed between the adjacent laminated sub-cores in each case. This radial cooling slot describes the intermediate space between adjacent laminated sub-cores which extends in a radial direction of the electrical machine. These radial cooling slots are present both in the first active part and in the second active part. A cooling medium, for example, cooling air, can flow through the radial cooling slots to cool the first active part and the second active part during the operation of the electrical machine. The electrical machine can be designed as an open or internally air-cooled electrical machine. The electrical machine can also have a closed internal cooling circuit.

Further, it is provided that the radial cooling slots in the first active part and the second active part are axially displaced in relation to one another and/or offset in relation to one another. In particular, this means that the radial cooling slots in the first active part are not aligned with the radial cooling slots in the second active part. For example, it can be provided that in order to ensure a large offset between the radial cooling slots in the first and second active part, the radial cooling slots in the second active part are as centered as possible in relation to the laminated sub-cores in the first active part. In this way, it is possible to prevent a continuous cooling channel being produced by the radial cooling slots in the first and the second active part, in which, for example, noise emissions can be generated.

In addition, the second active part comprises a cooling channel which extends in an axial direction and which leads into the respective radial cooling slots in the second active part. The cooling channel can extend over the complete axial length of the second active part. Thus, for example, a coolant flow can be introduced on the respective side areas of the second active part. The coolant flow which flows through the cooling channel is distributed over the respective radial cooling slots in the second active part. From there, the coolant flow arrives in the radial cooling slots of the first active part by way of the air gap between the first active part and the second active part. After leaving the radial cooling slots of the first active part, the coolant flow can be redirected again and thus routed to the cooling channel in the second active part. As a result of the longer route of the coolant and/or the cooling medium and the increased turbulence, the cooling of the electrical machine can also be improved. Furthermore, the altered flow resistances can also result in a reduction in friction losses.

According to the invention, it is now provided that the sum of the axial widths of all the individual laminations in the first active part corresponds to the sum of the axial widths of all the individual laminations in the second active part. In addition, it is particularly provided that the first active part and the second active part have the same overall length in the axial direction of the electrical machine. In other words, the overall axial length minus the respective axial lengths of the radial cooling slots is the same in the first and the second active part. The sum of the axial widths of all the individual laminations can also be referred to as the iron length. This therefore means that the iron length in the first active part and the iron length in the second active part are the same. The optimum utilization of the iron of the individual laminations over the entire length of the electrical machine is thus enabled. In addition, usually available calculation programs can be used as these are mostly based on the same iron length in the stator and rotor. In this way, on the one hand the electrical machine can be operated particularly quietly. In addition, the efficient operation of the electrical machine is enabled.

Moreover, it is provided according to the invention that the radial cooling slots in the second active part are divided into first cooling slots and second cooling slots, the first cooling slots having a first axial length and the second cooling slots a greater, second axial length compared to the first axial length. In other words, the widths of the radial cooling slots in the second active part are different. As the number of cooling slots in the second active part is greater than the number of radial cooling slots in the first active part, it is provided that the axial length of at least some of the radial cooling slots in the second active part is shorter. Thus, it is possible for the overall axial length of the first and the second active part to be the same and for the iron lengths in the first and the second active part to be the same.

Preferably, a number of individual laminations in the first active part essentially corresponds to a number of individual laminations in the second active part. In other words, an identical number of stator and rotor electrical sheets is provided. Furthermore, it can be provided that the individual laminations in the first active part and the individual laminations in the second active part are made of the same material. Furthermore, it is advantageous in this case if the individual laminations of the first active part and the individual laminations of the second active part are produced using the same tool. Thus, for example, it is possible to enable the individual laminations of the second active part and/or the rotor laminations to be produced from the remaining components of the individual laminations of the first active part and/or the stator laminations. In this way, the individual laminations and thus also the electrical machine can be produced particularly cost-effectively and with minimum effort.

It can also be provided that the number of individual laminations in the first active part is greater than the number of individual laminations in the second active part. Alternatively, it can be provided that the number of individual laminations in the first active part is smaller than the number of individual laminations in the second active part.

In a further embodiment, the axial width of all the individual laminations in the first active part and in the second active part is essentially the same. In other words, all the individual laminations in the electrical machine have the same axial width. As already explained, the respective individual laminations of the first active part and the second active part and/or of the stator and the rotor can be made from the same lamination. This enables cost-effective production of the active parts.

It can also be provided that the axial width of the individual laminations in the first active part differs from the axial width of the individual laminations in the second active part.

In principle, it can also be provided that the axial widths of the individual laminations inside the first active part and/or inside the second active part differ.

In an embodiment, a number of the radial cooling slots in the second active part is greater than a number of the radial cooling slots in the first active part. The cooling slots in the first active part and the second active part are not aligned with one another. This is achieved by the number of cooling slots in the first active part and the second active part differing. For example, the second active part may have one radial cooling slot more than the first active part. It can thus be achieved in a simple manner that the radial cooling slots are offset in relation to one another and thus the noise emissions of the electrical machine are reduced. Furthermore, it can thus be achieved that the radial passage area for the cooling medium, in particular the cooling air, remains unchanged, whereby it can continue to be ensured that apart from the height of the air gap, the exit surface on the second active part is equal to the entrance surface in the first active part. This results in uniform, low air resistance throughout the electrical machine.

In an alternative embodiment, it can be provided that the number of radial cooling slots in the first active part is greater than a number of the radial cooling slots in the second active part. Also in this way, it is possible for the cooling slot in the first active part and the second active part not to be aligned with one another.

Preferably the cooling slots are arranged in a middle region of the second active part. The radial cooling slots with the different width can in principle be distributed arbitrarily in the second active part. However, it is advantageous to provide the hot areas of the electrical machine which, for example, are arranged in a middle region of the electrical machine, with the second radial cooling slots which have a greater axial length compared to the first cooling slots. In this way, the cooling effect can be increased in the hot area of the electrical machine. The second cooling slots can then be arranged in the border areas of the second active part. Preferably it is provided that the arrangement of the radial cooling slots in the second active part is symmetrical. Uniform cooling of the second active part can thus be enabled.

In a further embodiment, the first active part comprises a plurality of grooves which each open into a surface of the first active part adjacent to the second active part, and into each of the grooves a locking element flush with the surface is introduced. The respective grooves in the first active part and/or in the stator may extend in a radial direction. In addition, the grooves may be uniformly distributed along a peripheral direction of the first active part. The winding of the electrical machine can be introduced into the respective grooves. In addition, a corresponding wedge can be introduced into the groove to hold the winding in the groove. Further, it is provided that the locking element is also introduced into each groove which, for example, can be made from a magnetic or an amagnetic material. The locking element is designed such that it is flush with the surface of the first active part. This surface of the first active part is the surface facing the second active part and/or the air gap. Thus, the first active part has a flat surface in the region of the grooves. Thus, noise emissions can also be reduced as the coolant flow does not encounter a laminated core with grooves open to the inside but a completely flat surface.

In a further embodiment, the electrical machine can be designed as an asynchronous machine. Such an asynchronous machine may have a rotor which is designed as a squirrel-cage rotor or as a slip ring rotor.

A wind turbine according to the invention comprises an electrical machine according to the invention. In this way, a wind turbine can be provided in which the overall noise and the tonalities which are induced as a result of the cooling medium flowing through the electrical machine are reduced.

The preferred embodiments and their advantages presented with regard to the electrical machine according to the invention apply accordingly to the wind turbine according to the invention.

BRIEF DESCRIPTION OF THE DRAWING

The invention is explained in more detail hereinafter with reference to preferred exemplary embodiments and with reference to the attached diagrams, in which.

DETAILED DESCRIPTION OF PREFERRED EMBODIMENTS

Figure 1:
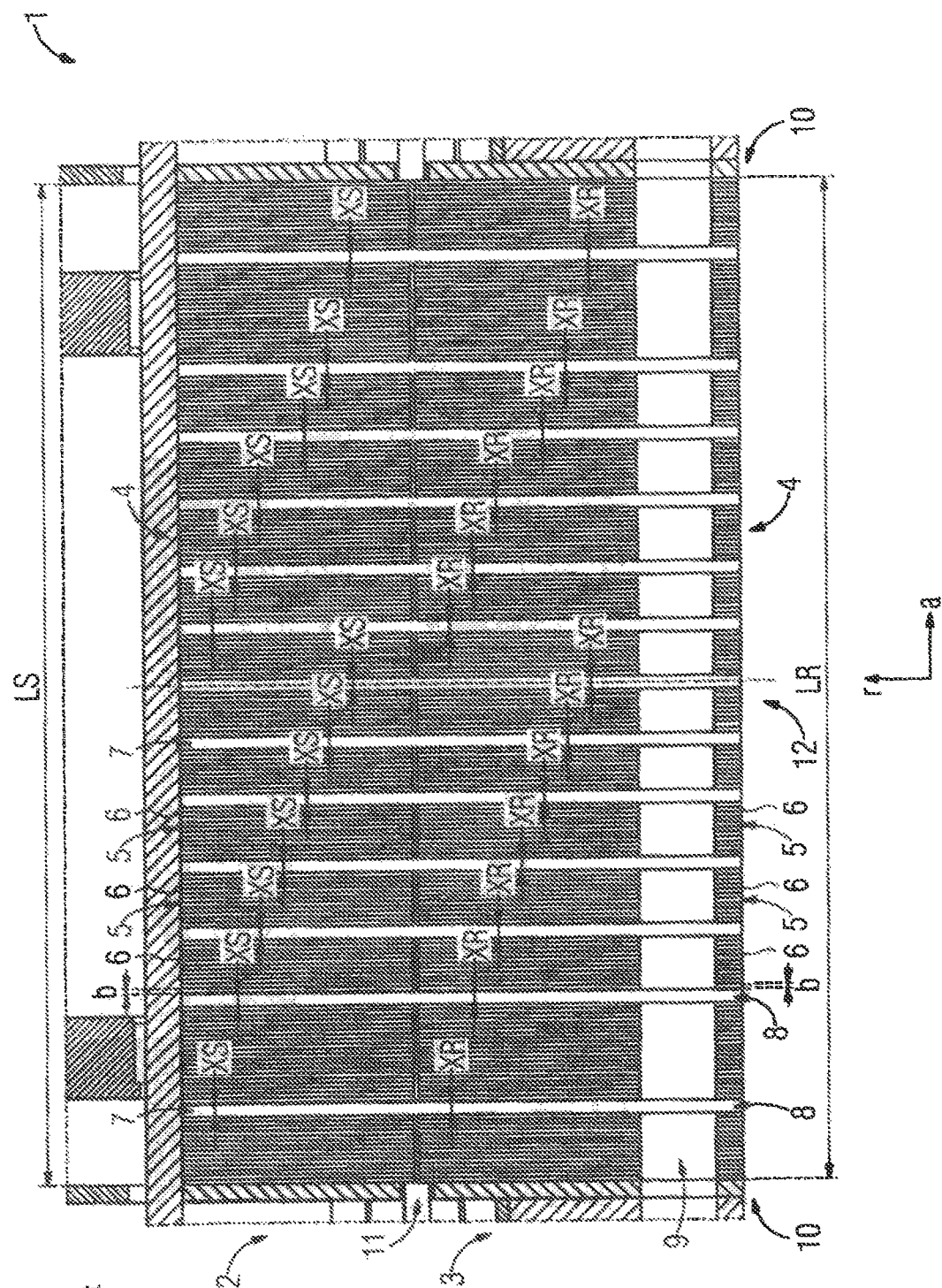
FIG. 1 shows an electrical machine according to the prior art in a cut side view.

In the figures the same elements and elements with the same function have the same reference characters.

FIG. 1 shows an electrical machine 1 according to the prior art in a cut side view. The electrical machine 1 comprises a first active part 2 in the form of a stator. Furthermore, the electrical machine 1 comprises a second active part 3 in the form of a rotor. The second active part 3 can be moved and/or rotated in relation to the first active part 2. The first active part 2 has an overall length LS in the axial direction a of the electrical machine 1 and the second active part 3 has an overall length LR in the axial direction a. In the present case, the overall lengths LS and LR of the active parts 2, 3 are the same.

Both the first active part 2 and the second active part 3 comprise a laminated core 4 with a plurality of individual laminations 6. The individual laminations 6 are grouped to form respective laminated sub-cores 5. The individual laminations 6 have an axial width b which describes the spatial extension of the individual laminations 6 in the axial direction a of the electrical machine 1. In the present case, all the individual laminations 6 have the same axial width b in the first active part 2 and in the second active part 3.

The respective laminated sub-cores 5 are mutually spaced in the axial direction a of the electrical machine 1. In the first active part 2, radial cooling slots 7 are thus formed and in the second active part 3, radial cooling slots 8 are formed. The radial cooling slots 7, 8 extend in the respective active part 2, 3 along a radial direction r of the electrical machine 1. The radial cooling slots 7 in the first active part 2 have an axial length XS. The radial cooling slots 8 in the second active part 3 have a radial length XR. In the present case, the axial length XS corresponds to the radial cooling slots 7 in the first active part 2 of the axial length of the XR of the radial cooling slots 8 in the second active part 3. Further, the radial cooling slots 8 in the second active part 3 are aligned with the radial cooling slots 7 in the first active part 2.

In the second active part 3 a cooling channel 9 is provided which extends in an axial direction a through the laminated sub-cores 5. Thus, for example, a cooling medium, for example, cooling air, can be introduced into the cooling channel 9 at the respective border areas 10 of the second active part 3. The cooling medium flowing through the cooling channel 9 then arrives at the radial cooling slots 8 in the second active part 3. From there it is routed by way of an air gap 11 into the radial cooling slots 7 of the first active part 2. After the cooling medium has left the radial cooling slots 7 of the first active part 2, the coolant flow can be redirected again and routed into the cooling channel 9 again. In this way, a cooling circuit can be provided.

Figure 2:
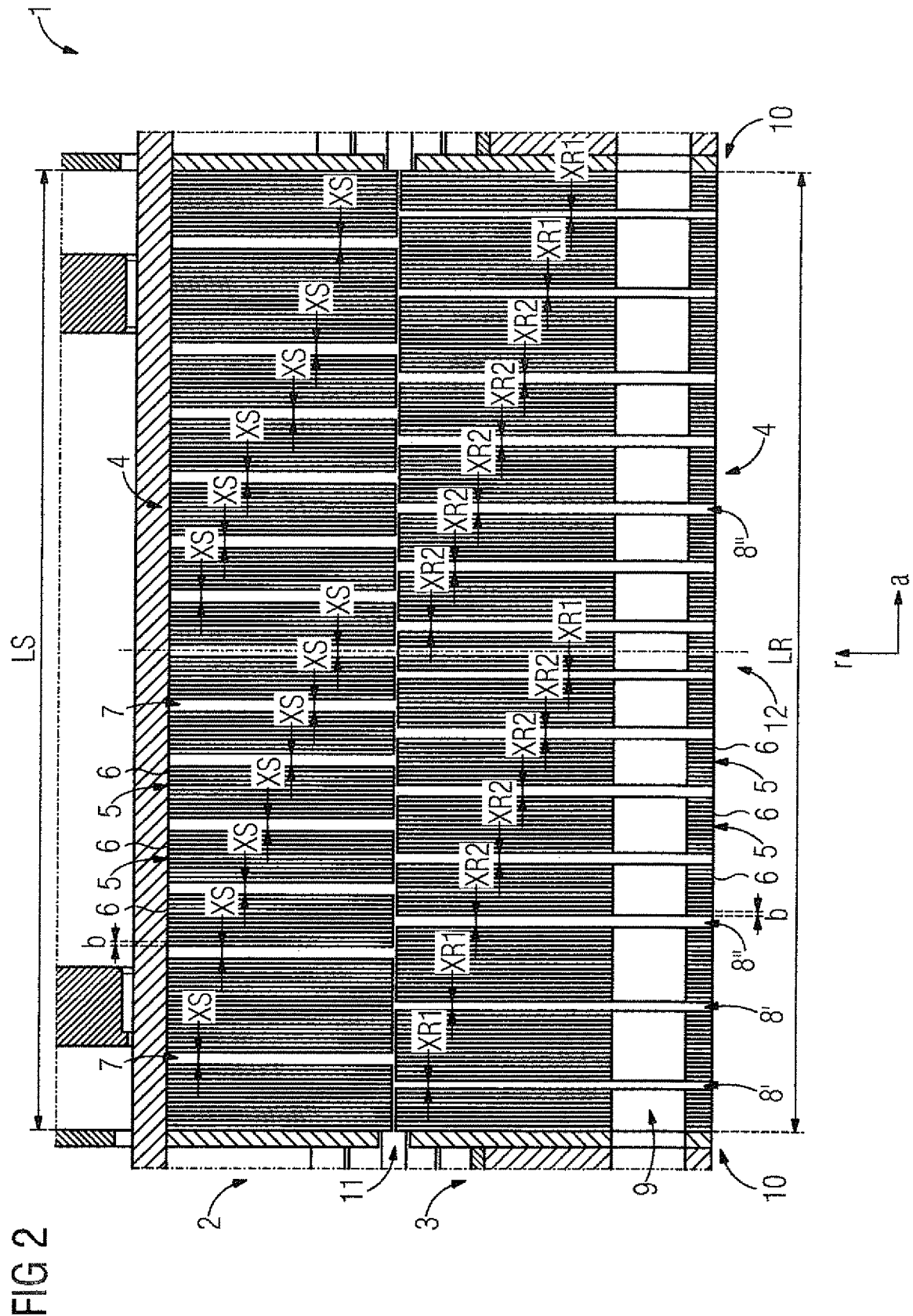
FIG. 2 shows an electrical machine according to an embodiment of the present invention in a cut side view.

FIG. 2 shows an electrical machine 1 according to an embodiment of the present invention in a cut side view. In the case of the electrical machine 1, the first active part 2 is designed analogous to the first active part 2 of the electrical machine 1 according to FIG. 1. The second active part 3 has been altered in comparison to the second active part 3 according to FIG. 1. The second active part 3 comprises first radial cooling slots 8' and second radial cooling slots 8". The first radial cooling slots 8' have an axial length XR1 and the second radial cooling slots 8" have an axial length XR2. The axial length XR2 of the second radial cooling slots 8" is greater than the axial length XR1 of the first radial cooling slots 8'. The axial length XR2 can be 10 mm, for example, and the axial length XR1 can be 8 mm, for example. The axial length XR2 of the second cooling slots 8" may correspond to the axial length XS of the radial cooling slots 7 in the first active part 2.

The number of radial cooling slots 8', 8" in the second active part 3 is greater than the number of radial cooling slots 7 in the first active part 2. In the present case, one radial cooling slot 8', 8" more is provided in the second active part 3 than in the first active part 2. This is achieved by the radial cooling slots 8', 8" having the different axial lengths XR1 and XR2 in the second active part 3. The number of the first cooling slots 8' and second cooling slots 8" was selected such that the overall length LR of the second active part 3 corresponds to the overall length LS of the first active part 2. If the axial length XR2 of the second cooling slots 8" corresponds to the axial length XS of the cooling slots 7 in the first active part, the first cooling slots 8' must be reduced once in total by the axial length XR2.

The cooling slots 8', 8" in the second active part 3 are arranged such that the second cooling slots 8" are essentially arranged in a middle region 12 of the second active part 3. This middle region 12 corresponds to a hot area of the electrical machine 1. This hot area can be cooled more effectively as a result of the second radial cooling slots 8" with the greater axial length. XR2 being arranged in this hot area. In addition, the radial cooling slots 8', 8" in the second active part 3 are essentially arranged symmetrically, achieving uniform cooling of the second active part 3. As the cumulative sum of the axial lengths XR1 and XR2 is equal to the sum of the axial lengths XR of the electrical machine 1 according FIG. 1, the cooling of the first and the second active part 2, 3 can be easily determined using existing calculation methods and with measurement values of conventional electrical machines, for example, of the electrical machine 1 according to FIG. 1 with cooling slots 7, 8 located precisely opposite one another.

Also in the electrical machine 1 according to FIG. 2, the respective individual laminations 8 have the same axial width b in the first active part 2 and the second active part 3. In addition, it is provided that the number of the individual laminations 6 is the same in the first active part 2 and the second active part 3. This ensures that the sum of the axial widths b of all the individual laminations 6 in the first active part 2 and the sum of the axial widths b of all the individual laminations 6 in the second active part 3 is the same. The sum of the axial widths in the respective active parts 2, 3 can also be referred to as the iron length. The iron length in the first active part 2 and in the second active part 3 is thus the same. In other words, the difference of the overall length LS of the first active part and all the axial lengths XS of the radial cooling slots 7 in the first active part 2 corresponds to the difference of the overall length LR and the axial lengths XR1, XR2 of all the radial cooling slots 8', 8" the second active part 3. This can be expressed by the following formula:

$$(LS-\Sigma(XS))=(LR-((\Sigma XR1)+(\Sigma XR2))).$$

As a result of the same iron length, the complete iron length can be put to optimum electromagnetic use both in the first active part 2 and in the second active part 3. In addition, simple and cost-effective production of the individual laminations 6 can be enabled by the identical number of the individual laminations 6 in the first active part 2 and the second active part 3. For example, the individual laminations 6 in the second active part can be formed from a remaining component of a lamination from which the individual laminations 6 of the first active part 2 were produced.

Figure 3:
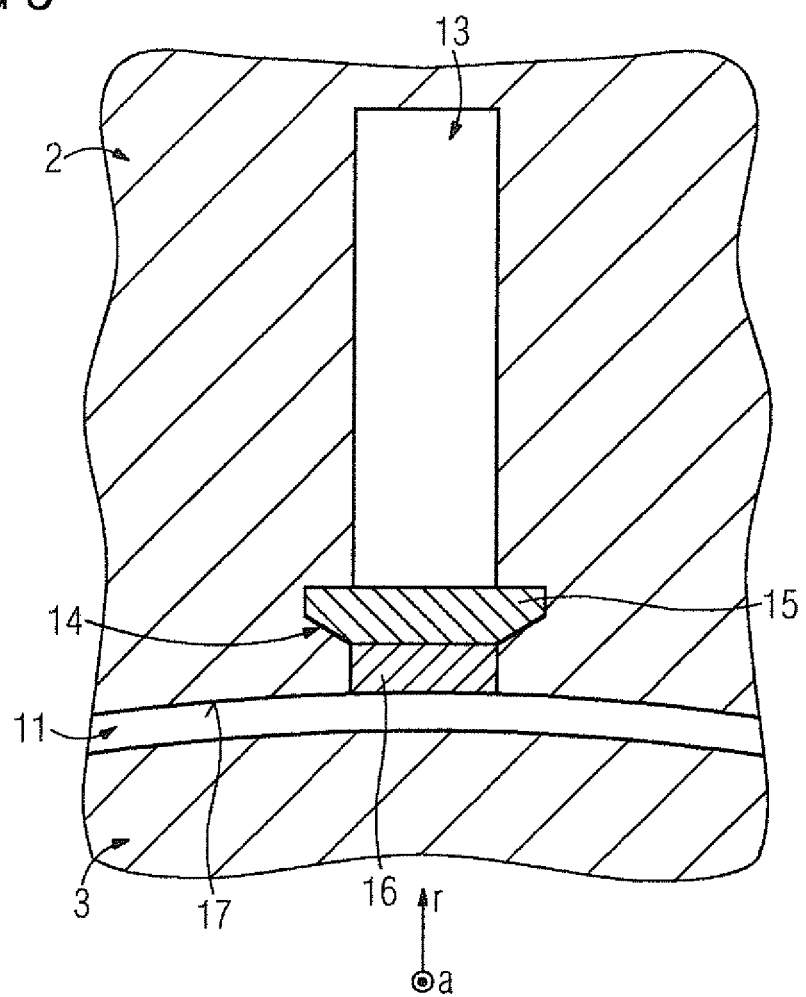
FIG. 3 shows a groove of the electrical machine in a cut side view.

FIG. 3 shows a partial presentation of the first active part 2 in a cut side view in which a groove 13 of the first active part 2 can be seen. A winding of the electrical machine 1 can be introduced into the groove 13. The groove 13 further has a recess 14 into which a wedge 15 is introduced. The wedge 15 serves to hold the winding not shown here in the groove 13. Furthermore, a locking element 16 is introduced into the groove 13 which is adjacent to the wedge 15. The locking element 16 can, in particular, be arranged in the region of the so-called leakage slot. The locking element 16 can be made from a magnetic or an amagnetic material. The locking element 16 is designed such that it is flush with a surface 17 of the first active part 2 which is adjacent to the air gap 11. A flat surface of the first active part 2 can thus be enabled. In this way, noise emissions can also be reduced.

In FIGS. 1 and 2 the first active part 2 and/or the stator is unchanged. The previously described measures on the second active part 3 and/or the rotor are likewise applicable to the cooling slot arrangement in the first active part 2. In principle, more than two axial lengths XR1 and XR2 can also be used for the radial cooling slots 8', 8" in the second active part.

What is claimed is:

1. An electrical machine, comprising:
   a first active part having a plurality of laminated sub-cores in axially spaced-apart relation such as to form a radial cooling slot formed between two adjacent ones of the laminated sub-cores of the first active part; and
   a second active part having a plurality of laminated sub-cores in axially spaced-apart relation such as to form a radial cooling slot between two adjacent ones of the laminated sub-cores of the second active part, with the radial cooling slots in the second active part being divided into first cooling slots of a first axial length and second cooling slots of a second axial length which is greater than the first axial length, said first and second cooling slots being arranged such that the second cooling slots are essentially arranged in a middle region of the second active part and distributed on both axial sides of a radially extending center plane, with the middle region corresponding to a hot area of the electrical machine,
   wherein each of the laminated sub-cores of the first and second active parts includes a plurality of individual laminations, each lamination defined by an axial width, such that a sum of the axial widths of all individual laminations in the first active part corresponds to a sum of the axial widths of all individual laminations in the second active part,
   wherein the radial cooling slots in the first active part are offset in an axial direction in relation to the radial cooling slots in the second active part,
   said second active part comprising a cooling channel which extends in the axial direction and leads into the radial cooling slots in the second active part, with a coolant flow being introduced into the cooling channel at border areas of the second active part, said coolant flow being distributed to the radial cooling slots in the second active part and flowing via an air gap between the first active part and the second active part to the radial cooling slots of the first active part.

2. The electrical machine of claim 1, wherein a number of individual laminations in the first active part essentially corresponds to a number of individual laminations in the second active part.

3. The electrical machine of claim 1, wherein the axial width of all the individual laminations in the first active part is essentially the same as the axial width of all the individual laminations in the second active part.

4. The electrical machine of claim 1, wherein a number of the radial cooling slots in the second active part is greater than a number of the radial cooling slots in the first active part.

5. The electrical machine of claim 1, wherein the first active part comprises a plurality of grooves which each open into a surface of the first active part adjacent to the second active part, and further comprising a locking element introduced flush with the surface into each of the grooves.

6. The electrical machine of claim 5, wherein the locking element is formed from a magnetic material or an amagnetic material.

7. The electrical machine of claim 1, constructed in the form of an asynchronous machine including a squirrel-cage rotor or a slip ring rotor.

8. A wind turbine, comprising an electrical machine, said electrical machine comprising a first active part having a plurality of laminated sub-cores in axially spaced-apart relation such as to form a radial cooling slot formed between two adjacent ones of the laminated sub-cores of the first active part; and a second active part having a plurality of laminated sub-cores in axially spaced-apart relation such as to form a radial cooling slot between two adjacent ones of the laminated sub-cores of the second active part, with the radial cooling slots in the second active part being divided into first cooling slots of a first axial length and second cooling slots of a second axial length which is greater than the first axial length, said first and second cooling slots being arranged such that the second cooling slots are essentially arranged in a middle region of the second active part and distributed on both axial sides of a radially extending center plane, with the middle region corresponding to a hot area of the electrical machine, wherein each of the laminated sub-cores of the first and second active parts includes a plurality of individual laminations, each lamination defined by an axial width, such that a sum of the axial widths of all individual laminations in the first active part corresponds to a sum of the axial widths of all individual laminations in the second active part, wherein the radial cooling slots in the first active part are offset in an axial direction in relation to the radial cooling slots in the second active part, said second active part comprising a cooling channel which extends in the axial direction and leads into the radial cooling slots in the second active part, with a coolant flow being introduced into the cooling channel at border areas of the second active part, said coolant flow being distributed to the radial cooling slots in the second active part and flowing via an air gap between the first active part and the second active part to the radial cooling slots of the first active part.

9. The wind turbine of claim 8, wherein a number of individual laminations in the first active part essentially corresponds to a number of individual laminations in the second active part.

10. The wind turbine of claim 8, wherein the axial width of all the individual laminations in the first active part is essentially the same as the axial width of all the individual laminations in the second active part.

11. The wind turbine of claim 8, wherein a number of the radial cooling slots in the second active part is greater than a number of the radial cooling slots in the first active part.

12. The wind turbine of claim 8, wherein the first active part comprises a plurality of grooves which each open into a surface of the first active part adjacent to the second active part, said electrical machine comprising a locking element introduced flush with the surface into each of the grooves.

13. The wind turbine of claim 12, wherein the locking element is formed from a magnetic material or an amagnetic material.

14. The wind turbine of claim 8, wherein the electrical machine is constructed in the form of an asynchronous machine including a squirrel-cage rotor or a slip ring rotor.

* * * * *